United States Patent
Panotopoulos

(10) Patent No.: US 7,349,602 B2
(45) Date of Patent: Mar. 25, 2008

(54) WAVELENGTH DIVISION MULTIPLEXER ARCHITECTURE

(75) Inventor: George Panotopoulos, Palo Alto, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 44 days.

(21) Appl. No.: 10/961,961

(22) Filed: Oct. 8, 2004

(65) Prior Publication Data

US 2006/0078252 A1    Apr. 13, 2006

(51) Int. Cl.
G02B 6/26    (2006.01)
G02B 6/42    (2006.01)

(52) U.S. Cl. .............. 385/47; 385/24; 385/33
(58) Field of Classification Search .......... 385/24, 385/33, 47; 398/68, 79
See application file for complete search history.

(56) References Cited

U.S. PATENT DOCUMENTS

| | | | |
|---|---|---|---|
| 6,198,864 B1 * | 3/2001 | Lemoff et al. | 385/47 |
| 6,542,306 B2 * | 4/2003 | Goodman | 359/634 |
| 6,563,976 B1 * | 5/2003 | Grann et al. | 385/24 |
| 6,941,047 B2 * | 9/2005 | Capewell et al. | 385/47 |
| 6,945,711 B2 * | 9/2005 | Chen et al. | 385/93 |

OTHER PUBLICATIONS

Lemoff, B. E. et al., "Zigzag waveguide demultiplexer for multimode WDM LAN," Electronics Letters, vol. 34, No. 10, p. 1014-1016, (May 14, 1998).

Buckman, Lisa A. et al., "Demonstration of a Small-Form-Factor WWDFM Transceiver Module for 10-Gb/s Local Area Networks," IEEE Photonics Technology Letters, vol. 14, No. 5, p. 702-704, (May 2002).

Lemoff, Brian E. et al., "MAUI: Enabling Fiber-to-the Processor With Parallel Multiwavelength Optical Interconnects," Journal of Lightwave Technology, vol. 22, No. 9, p. 2043-2054, Sep. 2004.

* cited by examiner

Primary Examiner—Michelle R. Connelly-Cushwa

(57) ABSTRACT

Embodiments of the invention involve separating the collimating function and tilting function into two separate optical elements. The separation increases tolerance to misalignment and simplifies the fabrication of the MUXes.

14 Claims, 3 Drawing Sheets

WAVELENGTH DIVISION MULTIPLEXER ARCHITECTURE

STATEMENT REGARDING FEDERALLY SPONSORED RESEARCH OR DEVELOPMENT

The invention was made in part with Government support by Defense Advanced Research Projects Agency (DARPA) under Grant Number: MDA972-02-3-005. The Government has certain rights in the invention.

BACKGROUND OF THE INVENTION

Wavelength division multiplexing (WDM) has been used in optical network communications systems and other applications. Essentially, different wavelengths of light would be used to carry information down one or more optical fibers. A WDM multiplexer would be used to couple the different wavelengths into a single fiber. Similarly, WDM demultiplexers are used to separate one or more wavelengths from the fiber. See Buckman, Lisa A. et al., "Demonstration of a Small-Form-Factor WWDM Transceiver Module for 10-Gb/s Local Area Networks," IEEE Photonics Technology Letters, Vol. 14., No. 5., p. 702-704, May 2002, and/or Lemoff, B. E. et al., "Zigzag waveguide demultiplexer for multimode WDM LAN," Electronic Letters, Vol. 34, No. 10, p. 1014-1016, May 14, 1998, the disclosures of which are hereby incorporated herein by reference.

Parallel optics and wavelength division multiplexing (WDM) are two optical communication techniques that permit increased bandwidth density in optical communications systems. In parallel optics, multiple optical signals are transmitted in parallel along a multioptical fiber ribbon, with a single optical signal being transmitted on each optical fiber. In WDM, multiple optical data signals are combined and transmitted on a single optical fiber, with each optical signal being carried on a different wavelength. In parallel WDM (PWDM), the two techniques are combined by transmitting multiple optical wavelengths through each optical fiber of a parallel optical fiber ribbon. A key component of a PWDM system is a PWDM multiplexer, an optical device that combines multiple optical beams into a single optical fiber.

In some implementations of PWDM, the optical transmitter includes an array of vertical cavity surface emitting lasers (VCSELs). The number of VCSELs in the array is typically equal to the number of optical fibers in the optical fiber ribbon multiplied by the number of wavelengths in each optical fiber. The optical multiplexer serves to couple light from one VCSEL into one optical fiber in the optical fiber ribbon. Typical multiplexers use wavelength selective means such as dielectric interference filters or diffraction gratings to accomplish this.

BRIEF SUMMARY OF THE INVENTION

In accordance with the invention, the collimating function and tilting function are separated into two separate optical elements. The separation increases tolerance to misalignment and simplifies the fabrication of the MUXes.

DETAILED DESCRIPTION OF THE INVENTION

One embodiment in accordance with the invention is an optical multiplexer (MUX) that is configured to receive collimated light from a plurality of light sources, the MUX comprising: a plurality of tilting elements, wherein each tilting element is capable of receiving collimated light from one source of the plurality of sources, and wherein each tilting element is capable of tilting incident light to a particular angle; a plurality of bandpass filters, wherein each filter will pass a particular range of wavelengths of light and reflect other wavelengths of light, wherein the particular range is different for each of the bandpass filters, and each bandpass filter is located to pass light that has been tilted by a respective tilting element; and a plurality of relay mirrors that reflect incident light and possibly re-collimate incident light; wherein each relay mirror is located to receive light from a particular bandpass filter and reflect the light to another bandpass filter.

Another embodiment in accordance with the invention is an optical system comprising: a plurality of collimated light sources, wherein each light source provides at least one wavelength of light that is different than wavelengths of light provided by the other sources of light; an optical multiplexer (MUX) that is configured to receive collimated light from the plurality of light sources, and to merge the collimated light into one optical path, wherein the MUX includes a plurality of tilting elements, wherein each tilting element receives collimated light from one source of the plurality of sources, and tilts the received light to a particular angle; and a light fiber having one end that is disposed in the one optical path to receive the merged light from the MUX.

A further embodiment in accordance with the invention is an optical multiplexer (MUX) that is configured to receive collimated light from a plurality of light sources, the MUX comprising: means for tilting the collimated light received from each source of the plurality of sources to a particular angle; means for combining the tilted light onto a single optical path; and means for coupling the combined light into a fiber.

The use of light as a data carrier is moving from the network level to the system level. Thus, WDM devices will be used to facilitate communications between different elements within a computer system, e.g. between different boards (e.g. system boards, daughter cards, etc.), peripheral components (I/O devices, hard drives, optical drives, etc.), other system components (e.g. processors, memory, sensors, etc.). One type of WDM is known as a multiwavelength assembly for ubiquitous interconnects (MAUI). For more information on MAUIs see Lemoff, Brian E. et al., "MAUI: Enabling Fiber-to-the-Processor With Parallel Multiwavelength Optical Interconnects," Journal of Lightwave Technology, Vol. 22, No. 9, p. 2043-2054, September 2004, which is hereby incorporated herein by reference.

Figure 1:
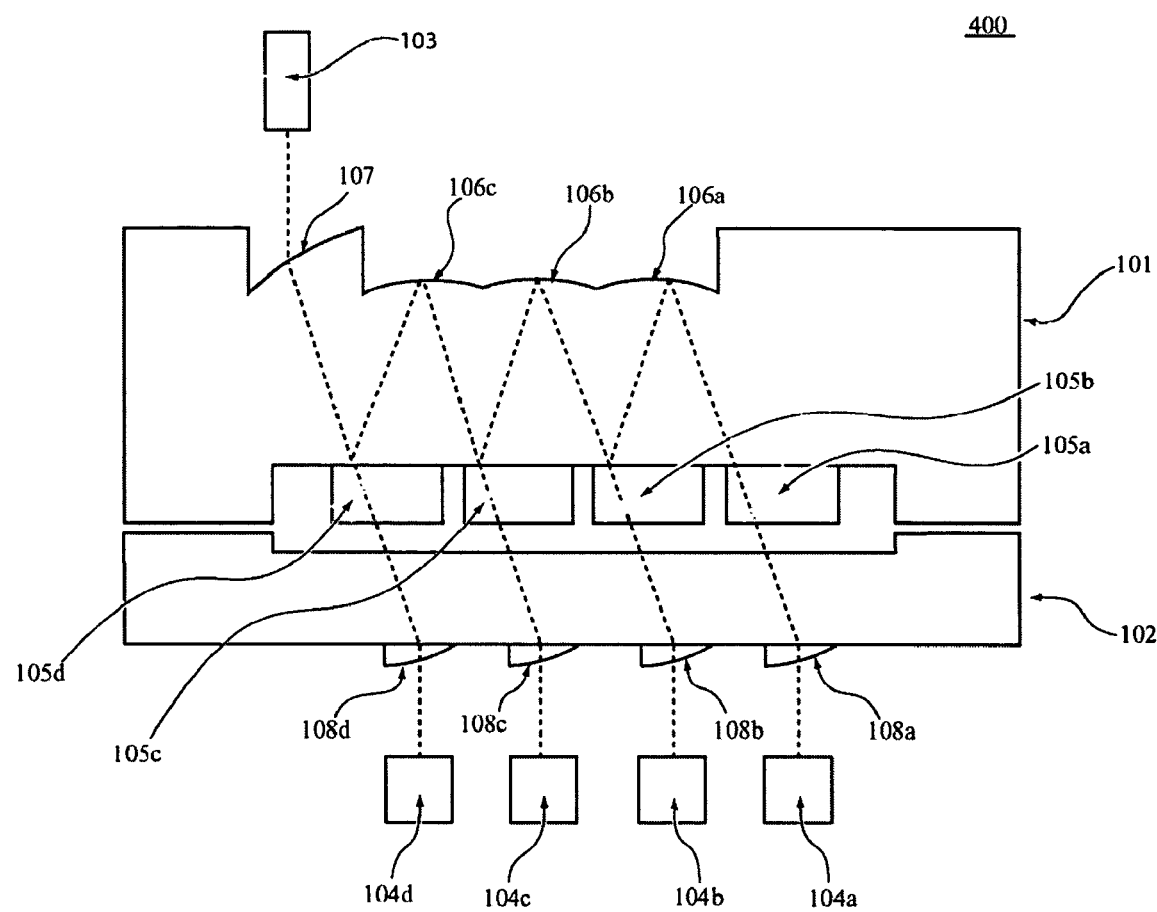
FIG. 1 depicts a system having a MUX, according to embodiments of the invention.

FIG. 1 depicts a system 400 having a typical MAUI micro-optical multiplexer (MUX) 400, which includes two elements 101, 102. The system also includes a plurality of sources 104a-104d, each of which has a different wavelength or range of wavelengths. The light sources may be lasers such as vertical cavity surface emitting lasers (VCSELs), but may be any type of source that provides light at a defined wavelength or range of wavelengths, for example edge emitting semiconductor lasers, other lasers, LED sources, etc. The MUX couples the light from the sources 104a-104d into output fiber 103.

The bottom element 102 of the MUX 400 has a plurality lenses 108a-108d, one for each light source 104a-104d. The lenses 108a-108d can be either refractive or diffractive elements, and perform two functions. The first function is to collimate the light received from the light sources 104a-104d. The second function is to tilt the light with respect to the angle of incidence of the light as it impinges onto the bottom element. The tilt allows the light to move laterally with each reflection in the top element 101.

The top element 101 has a plurality of relay mirrors 106a-106c, wherein the plurality is typically one less than the number of sources. Each relay mirror may have a non-planar surface to maintain the collimation of the light as the light travels through the MUX. The top element 101 also has a plurality of bandpass filters 105a-105d, wherein the plurality is typically equal to the number of sources. Each bandpass filter is designed to pass or transmit a particular wavelength (or range of wavelengths) of light, the bandpass filter will reflect all other wavelengths. The filters may comprise a plurality of layers that are composed of dielectric materials, e.g. dielectric film filters. The relay mirrors 106a-106c and the bandpass filters act together to bounce light between them, while laterally moving the light to the output lens 107, which couples the light to the output fiber 103. The output lens 107 may couple the light into the fiber 103 by focusing the light onto the end of the fiber 103. The top element and/or the bottom element may be formed from a material or several materials, include any of GaAs, GaP, InP, glass, plastic, or any other material with low optical loss in the wavelength range of interest, or combinations thereof.

The following is a discussion of the operation of the MUX 400. Light from source 104a is collimated and tilted by lens 108a, and passes through bandpass filter 105a. Note that bandpass filter 105a may not be needed, as no other light should be impinging on filter 105a. However, filter 105a may be used to reduce the coupling of undesirable light into the output fiber 103. In any event, the light is then reflected by relay mirror 106a to impinge onto bandpass filter 105b. Filter 105b will only pass light that has a wavelength or range of wavelengths of source 104b. Since the light from source 104a has a wavelength that is outside of the pass band of filter 105b, the light is reflected to relay mirror 106b. The light from source 104a is also outside of the pass bands of filters 105c and 105d. Thus, the light from source 104a is reflected between relay mirrors 106b, 106c and filters 105c and 105d. After reflecting off of filter 105d, the light impinges onto output lens 107 which couples the light into the output fiber 103. Light from the sources 104b, 104c, and 104d is similarly coupled into the output fiber 103.

An alternative arrangement for the MUX 400 of FIG. 1 is to place the collimating and tilting lens 108a-108d on the sources 104a-104d and remove the bottom element 102.

In FIG. 1, the alignment of each light source 104a-104d to the MUX bottom element 102 is critical since it defines the tilt angle. An error in the tilt angle causes the reflected light to be laterally displaced from its desired position. For example, the tilt error may cause the light to be shifted to the left of its desired position. Thus, after the light goes through lens 107, the light will be shifted more right and possibly not couple with the fiber 103. Moreover, the effect an error of the tilt angle is amplified due to the multiple bounces of the light on the path to the fiber 103. Thus, a small error introduced onto the light from source 104a will be magnified with each reflection in the MUX, and may prevent its coupling to the fiber 103.

Figure 2:
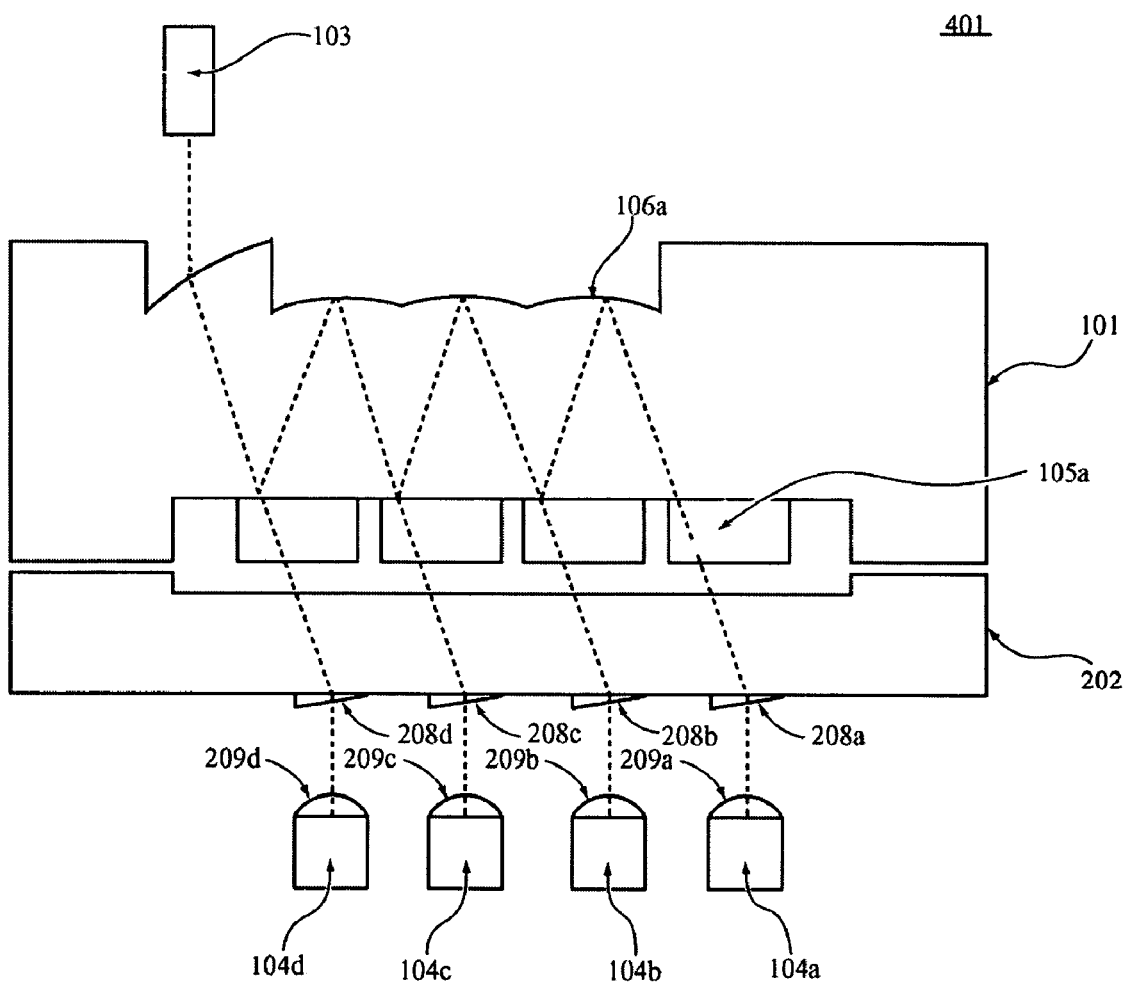
FIG. 2 depicts a system having an alterative arrangement of a MUX, according to embodiments of the invention.

FIG. 2 depicts a system 401 similar to the system 400 of FIG. 1, except that the lenses 208a-208d tilt the light, but do not collimate the light. Lenses 209a-209d, which are separate from lenses 208a-208d and are located proximate to the sources 104a-104d, collimate the light from sources 104a-104d. Lenses 208a-208d may be refractive elements (e.g. lenses or prisms) or diffractive elements (e.g. gratings). Lenses 209a-209d may be refractive elements (e.g. lenses) or diffractive elements (e.g. gratings). Note that one use of the system is to facilitate communications between boards and other components within a computer system. Consequently, system 401 should be relatively compact in size, in order to fit within the computer system. Therefore, it is counter-intuitive to increase the number of elements in a system, replacing one element that performed two functions, with two elements that each perform one function.

The MUX of FIG. 2 has the collimating and the tilting functions decoupled from each other, and the MUX in system 401 gains more tolerance for alignment errors. Since the function of each lens of the lenses 209a-209d is only collimation, it is not as sensitive to position relative to the light source active area. Furthermore, the lenses 208a-208b induce the same amount of tilt regardless of the exact incidence location. Consequently, the resulting MUX architecture is more tolerant to misalignment. In addition to the increased tolerance of the alignment of the MUX to the light sources, there is also an increase of the alignment tolerance of the MUX top element 101 to the MUX bottom element 202 during the assembly process. Note that the fiber 103 may be a waveguide, a multimode fiber, a single mode fiber, or other optical conducting path element.

Figure 3:
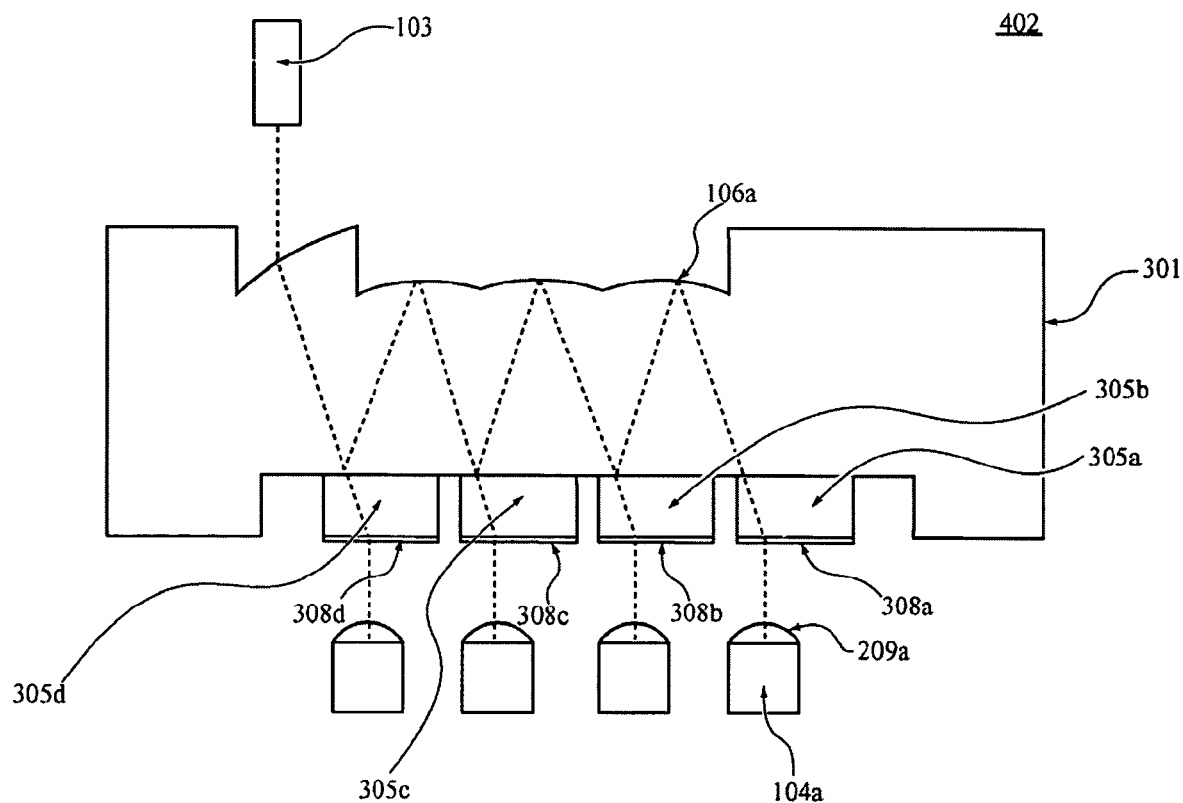
FIG. 3 depicts a system having another alterative arrangement of a MUX, according to embodiments of the invention.

FIG. 3 depicts a system 402 having another alterative arrangement of a MUX, according to embodiments of the invention. FIG. 3 is similar to the arrangement of FIG. 2, except that the bottom element 202 of FIG. 2 has been eliminated. In this arrangement, the tilting elements 308a-308d are located adjacent to the filters 305a-305d. Tilting elements 308a-308d may be diffractive elements (e.g. gratings) or refractive elements (e.g. lenses or prisms).

The tilting elements may be formed on the bottom surface of each of the filters. For example, if the tilting elements are gratings, then the integral grating and filter element may be formed by etching a grating on one side of a substrate and forming the filter on the other side of the substrate. The filters are usually deposited on some substrate, and that substrate could be etched.

The tilting elements may also be formed separately from the filters, and then later attached to the filter via an optical adhesive or other mechanism of attachment. The collimating lenses should be between the light sources and the tilting elements, but the collimating lenses may be part of the light sources (e.g. attached to the light sources) or they may be part of the MUX (e.g. attached to the MUX).

Note that the arrangements of FIGS. 1, 2, and 3, depict a 1×4 array, involving one fiber and four wavelengths of light. These arrangements are by way of example only as there may be more output fibers and/or more or fewer input wavelengths. Furthermore, additional MUXes may be located adjacent to the MUX 400, to form an M×N array, where M is the number of fibers and N is the number of wavelengths per fiber, to form a PWDM device.

Note that in the embodiments of the invention shown in FIGS. 1, 2, and 3, the collimating lens are shown to be attached to the light sources. However, in other embodiments, the collimating lens may be separate from the light sources, but still arranged to receive the light from the light sources and provide collimated light to the MUXes.

Note that the systems 401, and 402 of FIGS. 1-3 depict MUX arrangements, however embodiments of the invention may be used to form a demultiplexers (DEMUXes). For example, using FIG. 2, the fiber 103 would be an input fiber that is carrying a plurality of signals, each having a different wavelength or range of wavelengths. The light would proceed through elements 101 and 102, and light that is within the pass band of the filter would pass through that filter and be received by a sensor of the plurality of sensors 104a-104d. Light that is outside of the pass band would be reflected to the next filter. Thus, the DEMUX would operate to separate each signal and provide a respective signal to a respective sensor (one of 104a-104d).

The top element and the bottom element may be assembled using either an active assembly process or a passive assembly process. In an active process, light is put through the one of the elements. The other element is then positioned adjacent to the one element. When the device (comprising the one element and the other element) begins to function appropriately, then the two elements are properly aligned. The two elements are then secured to each other. In a passive process, each element has registration marks, which are used to properly orient the two elements. When the registration marks are properly aligned, then the two elements are secured to each other.

Portions of the top elements and the bottom elements (e.g. the bandpass filters) may be manufactured using various methods such as lithography, photolithography, gray-scale lithography, molding, embossing, etc.

Embodiments of the invention may be used in a computer system, a telecommunications system, a data communications system, a router, a switch, a network switch, a network, storage area network, and a data transfer link, e.g. data transfer from high bandwidth detectors (e.g. on a plane collecting data).

What is claimed is:

1. An optical device for coupling light to a plurality of waveguides, the device comprising:
    a plurality of light sources, wherein each light source provides at least one wavelength of light that is different than wavelengths of light provided by the other light sources;
    a first plane located proximate to the light sources, and comprising plurality of first optical elements that collimate the light from the light sources, wherein each first optical elements is associated with a respective light source;
    a second plane located separate from and proximate to the first plane, and comprising a plurality of second optical elements that tilt the light from the first plan to a particular angle, wherein each second optical elements is associated with a respective first optical element;
    a third plane located proximate to the second plane, and comprising a plurality of bandpass filters, wherein each filter will pass a particular range of wavelengths of light and reflect other wavelengths of light, wherein the particular range is different for each of the bandpass filters, and each bandpass filter is located to pass light that has been tilted by a respective second optical element; and
    a fourth plane proximate to the third plane, and comprising a plurality of relay minors that reflect incident light, and a plurality of output lenses, wherein a number of the plurality of output lenses is equal to a number of the plurality of waveguides, wherein each relay minor is located to receive light from a particular bandpass filter and reflect the light to another bandpass filter, wherein the relay mirrors and the bandpass filters operate to merging the light from the plurality of sources into an optical path, and wherein each output lens couples the light in the optical path to specific a waveguide;
    wherein the first plane, the second plane, the third plane, and the fourth plane are substantially parallel with each other; and
    wherein a number of the plurality of the light sources is greater than a number of the plurality of the waveguides.

2. The optical device of claim 1, wherein the first optical elements are one of refracting elements and diffractive elements.

3. The optical device of claim 1, wherein the second optical elements are one of refracting elements and diffractive elements.

4. The optical device of claim 1, wherein the optical device comprises at least a first component, and a second component, and the first component comprises the plurality of relay minors and the plurality of bandpass filters, and the second component comprises the plurality of second optical elements.

5. The optical device of claim 1, wherein the optical device comprises a single component comprising the plurality of relay mirrors, the plurality of bandpass filters, and the plurality of second optical elements.

6. The optical device of claim 1, wherein each tilting element is formed on a surface of a respective bandpass filter.

7. The optical device of claim 1, wherein each tilting element is attached to a respective bandpass filter.

8. The optical device of claim 1, wherein a number of the plurality of relay mirrors is one less than a number of second optical elements.

9. The optical device of claim 1, wherein the optical device is a component of a computer, and the optical device facilitates communications between at least two other components of the computer.

10. The optical device of claim 1, wherein the optical device is a component of a system selected from the group of systems consisting of:
    a computer system, a telecommunications system, a data communications system, a router, a switch, a network switch, a network, storage area network, and a data transfer link.

11. The optical device of claim 1, wherein each bandpass filter comprises a dielectric film filter.

12. The optical device of claim 1, wherein the optical device is composed of at least one material selected from the group consisting of:
    GaAs, GaP, InP, glass, plastic, and combinations thereof.

13. The optical device of claim 1, wherein each light source is selected from the group consisting of:
    a vertical cavity surface emitting laser, an edge emitting semiconductor laser, a laser, and a LED source.

14. The optical device of claim 1, wherein each waveguide is selected from the group consisting of:
    a light fiber, a multimode fiber, and a single mode fiber.

* * * * *

UNITED STATES PATENT AND TRADEMARK OFFICE
CERTIFICATE OF CORRECTION

PATENT NO. : 7,349,602 B2 Page 1 of 1
APPLICATION NO. : 10/961961
DATED : March 25, 2008
INVENTOR(S) : Panotopoulos It is certified that error appears in the above-identified patent and that said Letters Patent is hereby corrected as shown below:

In column 5, line 50, in Claim 1, delete "plan" and insert -- plane --, therefor.

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

PATENT NO.       : 7,349,602 B2
APPLICATION NO.  : 10/961961
DATED            : March 25, 2008
INVENTOR(S)      : George Panotopoulos It is certified that error appears in the above-identified patent and that said Letters Patent is hereby corrected as shown below:

Column 5, Line 62, Claim 1, delete "minors" and insert -- mirrors --;

Column 6, Line 1, Claim 1, delete "minor" and insert -- mirror --;

Column 6, Line 23, Claim 4, delete "minors" and insert -- mirrors --.

Signed and Sealed this

Twenty-second Day of June, 2010

David J. Kappos
*Director of the United States Patent and Trademark Office*